United States Patent
Imai

[11] 4,204,747
[45] May 27, 1980

[54] METHOD OF FOCUSSING IN A PHOTOGRAPHIC LENS SYSTEM

[75] Inventor: Toshihiro Imai, Hachiouji, Japan

[73] Assignee: Olympus Optical Co., Ltd., Tokyo, Japan

[21] Appl. No.: 963,366

[22] Filed: Nov. 24, 1978

[30] Foreign Application Priority Data
Nov. 29, 1977 [JP] Japan .................. 52-142168

[51] Int. Cl.² ............................ G02B 9/60
[52] U.S. Cl. ................. 350/216; 350/215; 350/220
[58] Field of Search ............ 350/215, 216, 176, 220

[56] References Cited
U.S. PATENT DOCUMENTS
4,045,128  8/1977  Momiyama ............... 350/216

Primary Examiner—Paul A. Sacher
Attorney, Agent, or Firm—Cushman, Darby & Cushman

[57] ABSTRACT

A method of focussing in a photographic lens system consisting of a front convergent lens group and a rear divergent lens group, the front lens group comprising a first lens component having a positive refracting power, a second lens component having a negative refracting power and a third lens component having a positive refracting power, the improvement being that the third lens component is caused to move within the photographic lens system.

3 Claims, 5 Drawing Figures

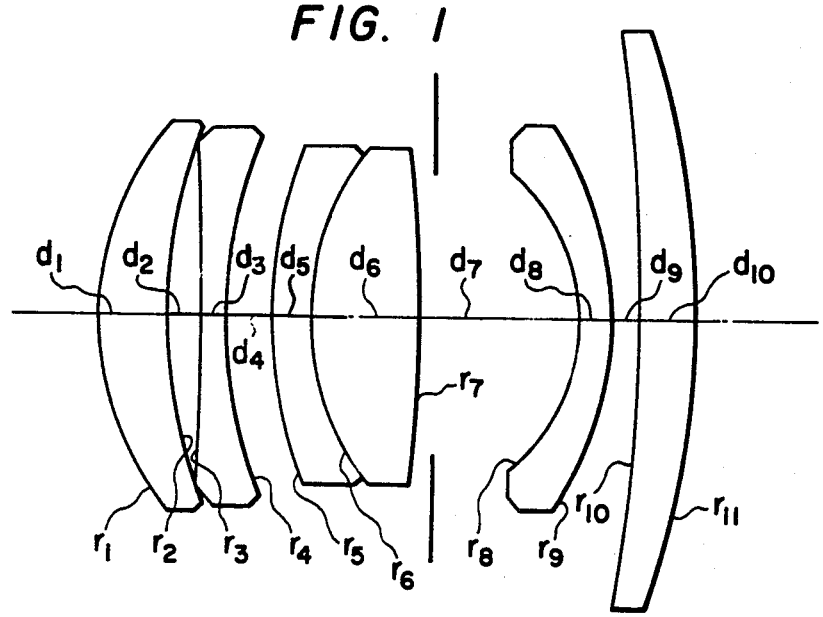
FIG. 1
FIG. 2
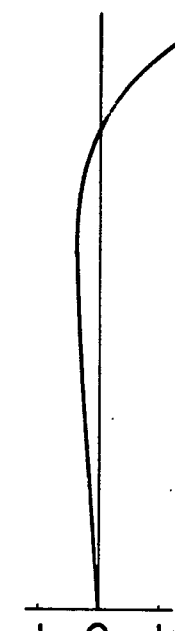
SPHERICAL ABERRATION
F=2.8
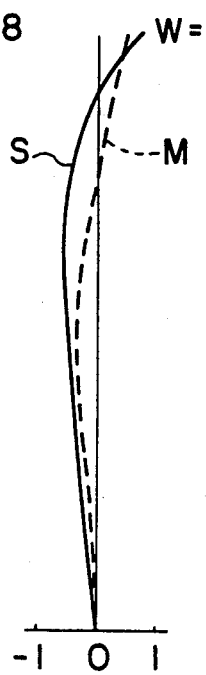
ASTIGMATISM
W=31°
S
M
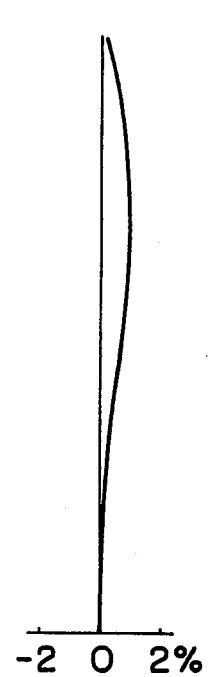
DISTORTION

SPHERICAL ABERRATION F=2.8

ASTIGMATISM W=32°

DISTORTION

SPHERICAL ABERRATION F=2.8

ASTIGMATISM W=32°

DISTORTION

SPHERICAL ABERRATION
F=2.8
-1 0 1

ASTIGMATISM
W=32°
S
M
-1 0 1

DISTORTION
-2 0 2 %

METHOD OF FOCUSSING IN A PHOTOGRAPHIC LENS SYSTEM

BACKGROUND OF THE INVENTION (a) Field of the invention

The present invention relates to a method of focussing and a photographic lens system therefor.

(b) Description of the prior art

In order to shorten the total length of a lens system for use in a compact camera, there are several methods available, one is to shorten a focal length of the lens system and another is to reduce the proportion between the length from the first surface of the lens system and the film surface to the focal length, that is, the telephoto ratio. In order to shorten the total length of the lens system markedly, it is necessary to use both these methods at the same time. Thus, it is desirable to use a lens system of telephoto type for the purposes of making the telephoto ratio small. When the focal length of the lens system of telephoto type is shortened, its angle of view becomes large so that it is necessary to make the lens characteristics good over a large angle of view at the off-axis.

Even if a photographic lens system satisfying the above-mentioned demands can be designed, that is, its total length is very short but the aberrations are well-corrected over a large angle of view, there exists a problem concerning the focussing. That is, in a lens system having the above-described composition, the back focus unavoidably becomes short so that it will be very difficult to arrange a shutter behind the lens system. Consequently, the shutter must be disposed between a front convergent lens group and a rear divergent lens group of the lens system of telephoto type. When the shutter is thus arranged between the front and rear lens groups, focussing by way of drawing out the total lens system becomes impossible. And, it has been known to make possible the focussing by way of fixing the front lens group and moving the rear lens group (as described, for example, in Japanese Published Unexamined Patent Application Nos. 139732/75 and 117126/77), however, by adopting this method, there must be a space in which the rear lens group moves, so that it becomes necessary to provide large spaces between the rear lens group and the film surface and between the shutter and the rear lens group and, as a result, the total length of the lens system becomes unavoidably long.

SUMMARY OF THE INVENTION

It is an object of the present invention to provide a method of focussing by causing a part of the lenses within the front lens group to move in the photographic lens system of telephoto type.

The present invention provides a method of focussing and a photographic lens system therefor in which there have been arranged a front convergent lens group and a rear divergent lens group with the front lens group comprising a first lens component having a positive refracting power, a second lens component having a negative refracting power and a third lens component having a positive refracting power, and the third lens component is caused to move within the photographic lens system.

Further objects and advantages will be apparent in the arrangements as set forth in the following specification taken together with the accompanying drawings.

DESCRIPTION OF THE DRAWINGS

FIG. 1 shows a sectional view of a photographic lens system adopting the method of focussing of the present invention.

FIG. 2 shows graphs illustrating various aberration curves for an infinite object point in the above lens system.

DESCRIPTION OF THE PREFERRED EMBODIMENT

Figure 3:
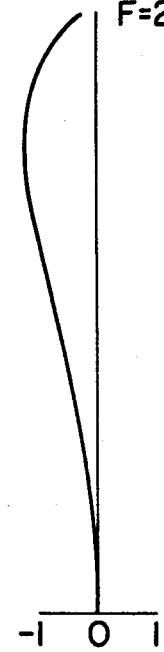
FIG. 3 shows graphs illustrating various aberration curves at a magnification of 1/50 in the case of focussing made by moving the third lens component in the same lens system.
Figure 3:
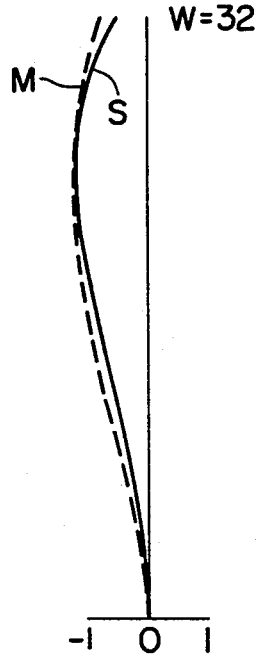
Figure 3:
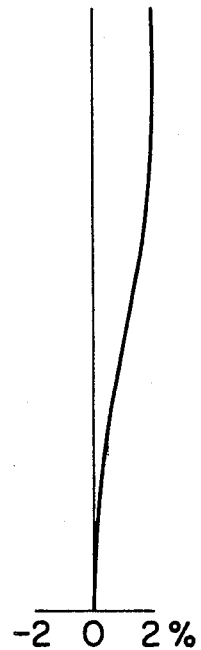

In a photographic lens system of telephoto type which is a triplet, that is, the front convergent lens group is consisted of a first lens component of positive lens, a second lens component of negative lens and a third lens component of positive lens, there are following methods of focussing by the front lens group. They are, for example, a method of moving only the first lens component, a method of moving the entire front lens group and a method of moving the second lens component and the third lens component together. Among these methods, the method of moving only the first lens component and the method of moving the entire front lens group cannot be adopted because the best position for the best image quality by an oblique beam of light and that by an axial beam of light are very different depending on the movement of the object point. This is also apparent from the aberration curves at a magnification of 1/50 (see FIGS. 4 and 5) in the case of focussing made by adopting the above described two methods in the lens system described hereinafter. That is, the aberration curves of the spherical aberration and astigmatism do not match with each other so that the best position for the axial beam of light and that for the oblique beam of light are different. The method of moving the second lens component and the third lens component together is not desirable because the amount of movement becomes too great.

The present invention which adopts the above described triplet as the front lens group is designed to perform the focussing by way of moving the third lens component within the front lens group in the photographic lens system of telephoto type. Thus, in the photographic lens system in which the total length is very short, the focussing can be performed without the characteristics of the lens being affected by moving the third lens component within the front lens group in the photographic lens system of telephoto type constructed of the three lens components as the front convergent lens group.

Under the above described focussing method, it is desirable that the lens system satisfies each of the following conditions in consideration of the lessening of the influence on the aberration of the lens system and the amount of the movement at focussing.

(1) $4 < f_{12}/f$
(2) $f_3/f < 0.7$
(3) $0.04 < d/f$ wherein the reference symbol f represents a focal length of the total lens system, the symbol $f_{12}$ represents a composite focal length of the first lens component and the second lens component, the symbol $f_3$ represents a focal length of the third lens component and the symbol d represents an air space between the second lens component and the third lens component, respectively.

Among these conditions, under condition (1), when $f_{12}/f$ becomes smaller than 4, an inclination of oblique luminous flux which enters the third lens component becomes large so that it is not desirable for focussing because of deterioration of the aberration. And under condition (2), when $f_3/f$ becomes larger than 0.7, it is necessary to make the amount of movement of the third lens component large so that it is not desirable from the viewpoints of space and aberration. It is necessary to make the third lens component move towards the object point for the focussing as the object point approaches closer. The condition (3) is established to secure the necessary space for this purpose. When $d/f$ becomes smaller than 0.04, the above-described space cannot be secured.

Next, one preferred embodiment of the present invention as described above is explained. As shown in FIG. 1, the lens composition is such that a front lens group comprises a first lens component of a positive lens, a second lens component of a negative lens and a third lens component of a cemented positive lens and a rear lens group comprises a fourth lens component of a negative lens and a fifth lens component of a positive lens. This lens system has the following data and is designed to perform the focussing by way of moving the third lens component.

| Embodiment | | | |
|---|---|---|---|
| $r_1 = 27.982$ | | | |
| | $d_1 = 7.28$ | $n_1 = 1.788$ | $\nu_1 = 47.43$ |
| $r_2 = 56.591$ | | | |
| | $d_2 = 3.06$ | | |
| $r_3 = -274.666$ | | | |
| | $d_3 = 2.91$ | $n_2 = 1.78472$ | $\nu_2 = 25.71$ |
| $r_4 = 53.688$ | | | |
| | $d_4 = 4.94$ | | |
| $r_5 = 44.984$ | | | |
| | $d_5 = 3.35$ | $n_3 = 1.8044$ | $\nu_3 = 39.62$ |
| $r_6 = 27.037$ | | | |
| | $d_6 = 10.69$ | $n_4 = 1.72$ | $\nu_4 = 46.03$ |
| $r_7 = -184.131$ | | | |
| | $d_7 = 15.89$ | | |
| $r_8 = -18.306$ | | | |
| | $d_8 = 2.91$ | $n_5 = 1.804$ | $\nu_5 = 46.57$ |
| $r_9 = -32.209$ | | | |
| | $d_9 = 2.95$ | | |
| $r_{10} = -186.613$ | | | |
| | $d_{10} = 4.95$ | $n_6 = 1.7495$ | $\nu_6 = 35.27$ |
| $r_{11} = -83.827$ | | | |
| | $f = 100$ | $f_B = 39.788$ | F 2.8 |
| | $f_{12} = 660.6$ | $f_3 = 55.2$ | |
| | $d = 4.94 + 29\beta$ | | |
| | $d' = 15.89 - 29\beta$ | | | wherein the reference symbols $r_1$ through $r_{11}$ represent radii of curvature of the respective lens surfaces, the symbols $d_1$ through $d_{10}$ represent the thicknesses of the respective lenses and air spaces between the lenses, the symbols $n_1$ through $n_6$ represent refractive indices of the respective lenses, the symbols $\nu_1$ through $\nu_6$ represent Abbe's numbers of the respective lenses and the symbol $f_B$ represents the back focus. And, the referencesymbol d ($d_4$ in this embodiment) represents the air space between the second lens component and the third lens component, the symbol d' ($d_7$ in this embodiment) represents the air space between the third lens component and the fourth lens component and the symbol $\beta$ represents the magnification of the total lens system, respectively.

Figure 4:
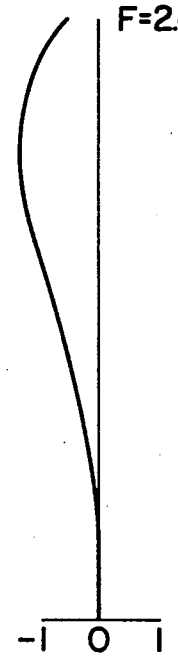
FIG. 4 shows graphs illustrating various aberration curves at a magnification of 1/50 in the case of focussing made by moving the first lens component in the same lens system.
Figure 4:
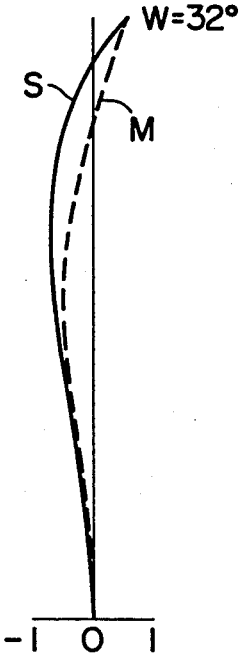
Figure 4:
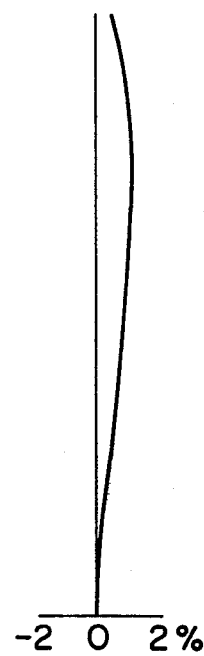
Figure 5:
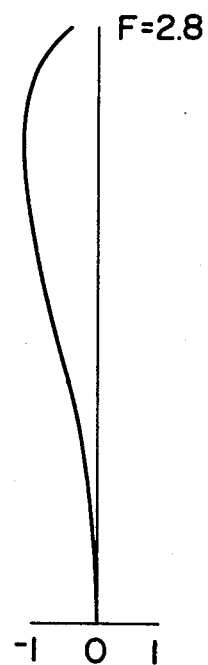
FIG. 5 shows graphs illustrating various aberration curves at a magnification of 1/50 in the case of focussing made by moving the front lens group in the same lens system.
Figure 5:
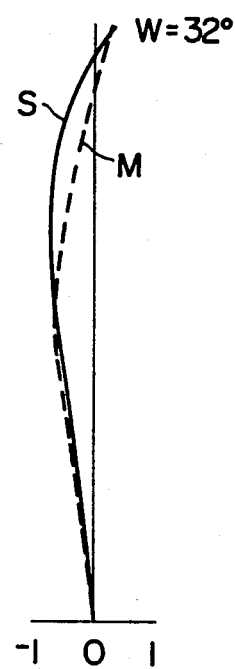
Figure 5:
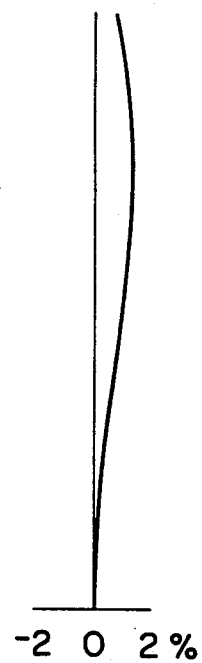

It is apparent from this embodiment that the focussing can be performed by making the third lens component move in the photographic lens system of telephoto type whose total length is short. As shown in FIG. 3, there is not much change in the conditions of aberration at that time as compared with the case wherein the focussing is made infinite as shown in FIG. 2. Further, the conditions of the spherical aberration and astigmatism match with each other and there is almost no difference between the best focussing position for the axial beam of light and that for the oblique beam of light. This is also apparent from the comparison between the various aberrations shown in FIG. 3 and the various aberrations detected when the focussing is made by moving the first lens component as shown in FIG. 4 and when the focussing is made by moving the entire front lens group as shown in FIG. 5. In order to make such a difference clearer, the compensating coefficients of the spherical aberration and the astigmatism in this embodiment are given below:

| | Spherical aberration | Astigmatism | |
|---|---|---|---|
| | | ($\Delta s$) | ($\Delta m$) |
| $d_1$ | −0.011282 | 0.002965 | 0.007798 |
| $d_2$ | −0.009686 | 0.003041 | 0.008380 |
| $d_3$ | −0.003851 | 0.005061 | 0.013319 |
| $d_4$ | −0.000642 | 0.006620 | 0.013448 |
| $d_5$ | −0.004797 | 0.004505 | 0.013288 |
| $d_6$ | −0.003876 | 0.004736 | 0.013700 |
| $d_7$ | −0.009589 | 0.001944 | 0.005812 |
| $d_8$ | −0.000249 | 0.006224 | 0.016458 |
| $d_9$ | 0.000137 | 0.000802 | 0.002738 |
| $d_{10}$ | 0.000090 | 0.001847 | 0.005459 |

The compensating coefficients given above are those which show the amount of change in aberration at the time when the value d is increased by a unit amount. Therefore, when the third lens component is moved to the object side as in the present invention, the air space $d_4$ is subject to a change in the negative direction and the air space $d_7$ to a change in the positive direction. Therefore, the spherical aberration is subject to a change in the positive direction by the change in $d_4$ and to a change in the negative direction by the change in $d_7$. As apparent from these values, the amount of the overall changes is in the negative and is of small value. On the other hand, $\Delta M$ with reference to the astigmatism is subject to a change in the negative direction by the change in $d_4$ and to a change in the positive direction by the change in $d_7$. The overall change is also in the negative direction and the amount of change is small. When the third lens component is moved to perform the focussing in this way, the amount of such changes is small and the spherical aberration and the astigmatism are subject to changes in the same direction. Such being the case, neither the spherical aberration nor the astigmatism is caused to be deteriorated by the focussing and their conditions of aberrations remain the same. On the contrary, both when the first lens component is moved and when the entire front lens group is moved, the spherical aberration and the astigmatism are subject to changes in the reversed directions and, thus, are undesirable.

It is to be understood that the compositions of lenses according to the present invention do not have to be limited to the composition of the lenses of the embodiment described above and, thus, the front lens group may well be of single lenses or cemented lenses of three lens components in so far as they consist of positive, negative and positive lens components. The rear lens group is only required to be of divergent type. As explained and exemplified hereinabove, by the method of focussing in accordance with the present invention, it is possible to achieve the desired focussing in such a way that, with a lens system which is adapted for use in a compact camera and whose total length is very short, the total length of the lens system and the characteristics of the lenses such as aberrations do not have any influence on the performance of focussing.

A lens system in which a part of the lenses in the lens system moves along the optical axis has been made known (through, for example, Japanese Published Examined Patent Application Nos. 9227/63 and 39875/70). Such a lens system is for the purpose of correcting aberrations and is designed to perform focussing by moving the entire lens system and, therefore, its object is entirely different from that which is intended by the method of focussing according to the present invention. Such a lens system does not suggest the method of focussing according to the present invention either.

I claim:

1. A method of focussing in a photographic lens system by arranging a front convergent lens group and a rear divergent lens group with the said front convergent lens group comprising a first lens component having a positive refracting power, a second lens component having a negative refracting power and a third lens component having a positive refracting power, and by causing the said third lens component to move within the said photographic lens system.

2. A photographic lens system having a front convergent lens group and a rear divergent lens group, the said front convergent lens group comprising a first lens component having a positive refracting power, a second lens component having a negative refracting power and a third lens component having a positive refracting power, the said third lens component being movable in performing the focussing, and the said lens system satisfying the following conditions:

(1) $4 < f_{12}/f$
(2) $f_3/f < 0.7$
(3) $0.04 < d/f$ wherein the reference symbol $f_{12}$ represents the composite focal length of the first and second lens components, the symbol $f_3$ represents the focal length of the third lens component, the symbol $f$ represents the focal length of the total lens system and the symbol $d$ represents the axial air space between the second and the third lens components.

3. A photographic lens system according to claim 2, in which the said front lens group comprises a first lens component of a single positive lens, a second lens component of a single negative lens and a third lens component of a cemented positive lens and the said rear lens group comprises a fourth lens component of a positive lens and a fifth lens component of a positive lens, having the following data:

| | | | |
|---|---|---|---|
| $r_1 = 27.982$ | | | |
| $r_2 = 56.591$ | $d_1 = 7.28$ | $n_1 = 1.788$ | $v_1 = 47.43$ |
| $r_3 = -274.666$ | $d_2 = 3.06$ | | |
| $r_4 = 53.688$ | $d_3 = 2.91$ | $n_2 = 1.78472$ | $v_2 = 25.71$ |
| $r_5 = 44.984$ | $d_4 = 4.94$ | | |
| $r_6 = 27.037$ | $d_5 = 3.35$ | $n_3 = 1.8044$ | $v_3 = 39.62$ |
| $r_7 = -184.131$ | $d_6 = 10.69$ | $n_4 = 1.72$ | $v_4 = 46.03$ |
| $r_8 = -18.306$ | $d_7 = 15.89$ | | |
| $r_9 = -32.209$ | $d_8 = 2.91$ | $n_5 = 1.804$ | $v_5 = 46.57$ |
| $r_{10} = -186.613$ | $d_9 = 2.95$ | | |
| $r_{11} = -83.827$ | $d_{10} = 4.95$ | $n_6 = 1.7495$ | $v_6 = 35.27$ |
| | $f = 100$ | $f_B = 39.788$ | F 2.8 |
| | $f_{12} = 660.6$ | $f_3 = 55.2$ | |
| | $d = 4.94 + 29\beta$ | | |
| | $d' = 15.89 - 29\beta$ | | | wherein the reference symbols $r_1$ through $4_{11}$ represent the radii of curvature of the respective lens surfaces, the symbols $d_1$ through $d_{10}$ represent the axial thicknesses of the respective lenses and the axial air spaces between the lenses, the symbols $n_1$ through $n_6$ represent the refractive indices of the respective lenses, the symbols $v_1$ through $v_6$ represent the Abbe's numbers of the respective lenses, the symbol $f$ represents the focal length of the total lens system, the symbol $f_B$ represents the back focus, the symbol F represents the F-number, the symbol $f_{12}$ represents the composite focal length of the first and second lens components, the symbol $d$ represents the axial air space between the second and third lens components ($=d_4$), the symbol $d'$ represents the axial air space between the third and fourth lens components ($=d_7$) and the symbol $\beta$ represents the magnification.

* * * * *